United States Patent [19]
Linstid, III et al.

[11] Patent Number: 6,114,492
[45] Date of Patent: Sep. 5, 2000

[54] PROCESS FOR PRODUCING LIQUID CRYSTAL POLYMER

[75] Inventors: H. Clay Linstid, III, Clinton; Vincent J. Provino, Clifton, both of N.J.

[73] Assignee: Ticona LLC, Summit, N.J.

[21] Appl. No.: 09/483,589

[22] Filed: Jan. 14, 2000

[51] Int. Cl.[7] .................................... C08G 63/00
[52] U.S. Cl. .......................... 528/181; 528/176; 528/190; 528/193; 528/194; 528/206; 528/212; 524/777; 524/785
[58] Field of Search ...................... 528/176, 181, 528/190, 193, 194, 206, 212, 218, 219, 275, 280; 524/777, 785

[56] References Cited

U.S. PATENT DOCUMENTS

| | | | |
|---|---|---|---|
| 4,395,536 | 7/1983 | Charbonneau | 528/206 |
| 4,429,105 | 1/1984 | Charbonneau | 528/207 |
| 4,742,149 | 5/1988 | Finestone | 528/179 |
| 4,912,193 | 3/1990 | Dicke et al. | 528/193 |
| 4,957,996 | 9/1990 | Lamonte | 528/181 |
| 4,959,445 | 9/1990 | Rosenfeld | 528/181 |
| 5,015,723 | 5/1991 | Sugimoto et al. | 528/190 |
| 5,142,017 | 8/1992 | Sugimoto et al. | 528/192 |
| 5,616,680 | 4/1997 | Linstid, III | 528/183 |
| 5,656,714 | 8/1997 | Shen et al. | 528/193 |

FOREIGN PATENT DOCUMENTS 321113  7/1996  Japan .

*Primary Examiner*—Samuel A. Acquah
*Attorney, Agent, or Firm*—Karen E. Klumas

[57] ABSTRACT

A potassium catalyst is used in combination with a cobalt catalyst to increase the reaction rate and/or reduce the reaction temperature of a melt polymerization process for producing an anisotropic melt-phase forming polymer derived from p-hydroxybenzoic acid, 6-hydroxy-2-naphthoic acid, aromatic hydroxycarboxylic acid, aromatic diol, at least a portion of which is resorcinol and at least one aromatic dicarboxylic acid, compared to a like process wherein either catalyst is used alone.

11 Claims, No Drawings

PROCESS FOR PRODUCING LIQUID CRYSTAL POLYMER

RELATED APPLICATIONS

The following copending application, filed on even date herewith, contains related subject matter: U.S. application Ser. No. 09/483,765.

BACKGROUND OF THE INVENTION

1. Field of the Invention

This invention relates to melt polymerization processes for producing anisotropic melt-phase forming polymers wherein polymerization temperatures are decreased and/or polymerization rates increased by utilizing a catalyst system, the components of which are more effective when used together than alone. This invention further relates to a processes for producing an anisotropic melt-phase forming polymer consisting essentially of recurring units derived from p-hydroxycarboxylic acid, 6-hydroxy-2-naphthoic acid, at least one aromatic diacid, and at least one aromatic diol, at least a portion of which is resorcinol, wherein said polymer is melt polymerized using a potassium catalyst in combination with a cobalt co-catalyst.

2. Description of the Prior Art

A variety of methods have been disclosed for producing anisotropic melt-phase forming polymers from aromatic hydroxycarboxylic acid, aromatic diol and aromatic diacid reactants, including for example, solution, emulsion and melt polymerizations. Commercially, melt polymerizations offer the advantages of simplicity and lower cost, compared to many solution and emulsion polymerizations. Melt polymerization reactions typically employ a catalyst to promote polycondensation of the reactant materials.

In U.S. Pat. No. 5,616,680, describing the production of aromatic melt-forming polymers having repeating units derived from (a) aromatic hydroxycarboxylic acid, (b) aromatic diol and/or aromatic hydroxyamine and (c) aromatic dicarboxylic acid, polycondensation catalysts are disclosed as including dialkyl tin oxide, diaryl tin oxide, titanium dioxide, alkoxy titanium silicates, titanium alkoxides, alkali and alkaline earth metal slats of carboxylic acids, gaseous acid catalysts and the like. Polycondensation catalysts disclosed in U.S. Pat. No. 4,912,193, describing the production of thermotropic wholly aromatic polyesters containing condensed residues of p-hydroxybenzoic acid, 4,4'-dihydroxydiphenyl isophthalic acid and terephthalic acid, include Lewis acids and hydrohalic acid; oxides, hydrides, hydroxides, halides, alcoholates, phenolates and salts of inorganic or organic acids, complex salts or mixed salts of alkaline earth metals such as magnesium or calcium; of sub-group elements such as vanadium, titanium, manganese, cobalt, nickel, zinc, lanthanum, cerium or zirconium or of elements from other groups of the periodic system, such as germanium, tin, lead and antimony, or the alkali metals or alkaline earth metals as such, in particular sodium; also sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadyl-$C_1$ to $C_8$-alkoxides, titatium alkoxides such as titanium tetrabutylate, titanium tetrapropylate, alkoxytitanium silicates, zirconium butylate, zirconium propylate, titanium tetraphenolate, sodium phenolate, germanium dioxide, antimony trioxide, dialkyl and diaryl tin oxide, dibutyl tin diacetate and dibutyl dimethoxy tin. U.S. Pat. No. 5,015,723 discloses processes for producing aromatic polyesters, including aromatic polyesters obtained from an aromatic dicarboxylic acid, an aromatic diphenol and an aromatic oxycarboxylic acid wherein compounds of Ge, Sn, Ti, Sb, Co, Mn, and the like are identified as polycondensation catalysts. Polycondensing aromatic dicarboxylic acids, dihydroxy phenols and p-hydroxybenzoic acid in the presence of a salt such as aluminum acetate, calcium acetate, calcium sulfate, copper acetate, magnesium acetate, magnesium terephthalate, potassium acetate, potassium chloride, potassium phosphate, sodium acetate, sodium sulfate and potassium bisulfate alkaline earth metal salt or an alkali metal salt to form a prepolymer that is subsequently advanced to a desired degree of polymerization by solid stating techniques is disclosed in U.S. Pat. No. 4,742,149.

The catalyst of choice may differ depending upon whether the polymerization proceeds by direct reaction of the aromatic hydroxycarboxylic acid, aromatic diol and aromatic diacid starting materials, as opposed to reaction of the aromatic diacid and an acetylated form of the aromatic diol and aromatic hydroxycarboxylic acid reactants. Reactant composition is another factor that may affect catalyst selection. U.S. Pat. No. 5,656,714, for example, exemplifies the use of a potassium acetate catalyst in the production of a polyester from terephthalic acid, 6-hydroxy-2-naphthoic acid, p-hydroxybenzoic acid, 4,4'-biphenol, and resorcinol; the hydroxyaromatic acid and diol components being acetylated in situ by reaction with acetic anhydride, whereas, U.S. Pat. No. 4,421,908 exemplifies a direct polymerization process wherein 6-hydroxy-2-naphthoic acid, hydroquinone and terephthalic acid are reacted in the presence of a dibutyl tin diacetate catalyst.

It is generally desirable to conduct melt polymerization reactions in the shortest time and at the lowest temperature practical. Frequently these conditions are in an inverse relationship such that by increasing reaction temperature, reaction time is minimized. Increasing reaction temperature may, however, lead to polymer degradation and the production of undesirable by-products. If reaction temperatures are too low, it may not be possible to attain desired molecular weights in commercially viable reaction times. Optimization of reaction conditions can be particularly difficult in situations where the use of numerous raw materials gives rise to competing reaction kinetics. A melt polymerization process for producing an anisotropic melt-phase forming polymer consisting essentially of recurring units derived from p-hydroxybenzoic acid, 6-hydroxy-2-naphthoic acid, an aromatic diol, at least a portion of which is resorcinol, and at least one aromatic dicarboxylic acid utilizing a catalyst system that results in increased reaction rates and/or reduced reaction temperatures is desired.

It is an object of this invention to provide such a process. It is a further object of this invention to produce an anisotropic melt-phase forming polymer consisting essentially of recurring units derived from 6-hydroxy-2-naphthoic acid, p-hydroxybenzoic acid, terephthalic acid, resorcinol and 4,4'-biphenol using a catalyst system that results in increased reaction rates and/or reduced reaction temperatures. These and other aspects of this invention are described in greater detail in the description and examples that follow.

SUMMARY OF THE INVENTION

In accordance with one embodiment of this invention, it has been found that the use of a potassium catalyst in combination with a cobalt catalyst increases the reaction rate and/or reduces the reaction temperature of a melt polymerization process for producing an anisotropic melt-phase forming polymer derived from p-hydroxybenzoic acid, 6-hydroxy-2-naphthoic acid, an aromatic diol, at least a portion of which is resorcinol, and an aromatic dicarboxylic acid, compared to the use of either catalyst alone.

This invention relates to a process for preparing an anisotropic melt-phase forming polymer consisting essentially of recurring units I, II, III, IV and V, wherein:

recurring unit I is:

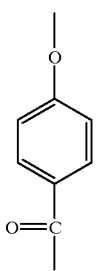

recurring unit II is:

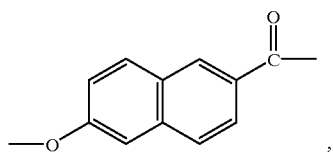

recurring unit III is:

—O—Ar¹—O— wherein Ar¹ is a divalent radical selected from the group consisting of:

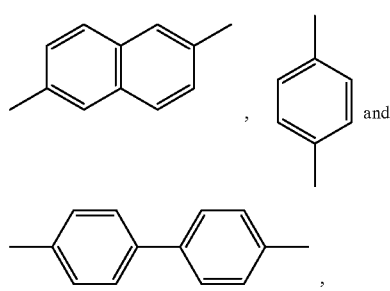

and mixtures thereof, recurring unit IV is:

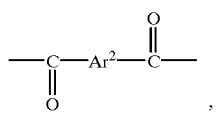

wherein Ar² is selected from the group consisting of:

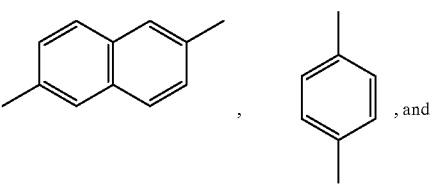

, and

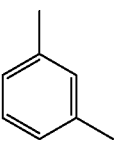

and mixtures thereof, and recurring unit V is:

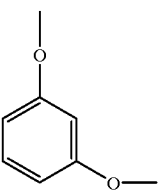

which process comprises reacting the aromatic diacid from which recurring unit IV is derived and acetate form of the reactants from which recurring units I, II, III and V are derived in the presence of a catalytic amount of a catalyst system comprising a potassium catalyst in combination with a cobalt catalyst.

In another embodiment, this invention relates to a process for producing an anisotropic melt-phase forming polymer consisting essentially of recurring units I through V described above, which process comprises the steps of:

(a) heating a polymerization mixture comprising the aromatic diacid and acetate form of the reactants from which recurring units I to V are derived in the presence of a polycondensation catalyst comprising a potassium catalyst and a cobalt catalyst to a temperature sufficient to induce polymerization at a rate which avoids sublimation of the acetates or the oligomeric products initially produced; and (b) maintaining the mixture at polymerization temperature for a period of time sufficient to produce a polymer of desired melt viscosity.

DETAILED DESCRIPTION OF THE INVENTION

In the practice of this invention, the polymerization reaction proceeds through the acetate form of the aromatic hydroxycarboxylic and aromatic diol reactants. Thus, it is possible to employ as starting materials reactants having pre-acetylated hydroxyl groups, introduce the potassium and cobalt catalysts, heat the reaction mix to polycondensation temperature and maintain reaction until a desired polymer viscosity is reached. Alternatively, it is possible to acetylate in situ, in which case the aromatic hydroxycarboxylic acid and aromatic diol are reacted with an acetic anhydride, acetic acid byproduct is removed, the esterified reactants together with the aromatic diacid, and the potassium and cobalt catalysts are heated to polycondensation temperature, and reaction is maintained until a desired polymer viscosity is reached. The aromatic diacid reactant may, but need not, be present during the acetylation reaction.

If the acetylation and polycondensation reactions are conducted in a single reactor, it is common to charge the reactor with diol, hydroxy-carboxylic acid, diacid, anhydride, and catalysts in a single step. Using separate acetylation and polymerization reactors, it may be desirable to introduce the diacid component to the polymerization reactor as opposed to the acetylation reactor, however, the catalysts are most conveniently added to the acetylation reactor and transferred to the polymerization reactor along with the acetylated hydroxycarboxylic acid and diol reactants.

Acetylation is generally initiated at temperatures of about 90° C. In the initial stage of the acetylation, reflux is desirably employed to maintain vapor phase temperature below the point at which acetic acid byproduct and anhydride begin to distill. Temperatures during the initial stage of acetylation typically range from between 90° to 150° C., preferably about 100° to about 130° C. In order to complete the acetylation, the reaction mixture is then heated to final melt temperature of about 150° to about 220° C., preferably about 150° to about 200° C., with temperatures of 1800 to 200° C. being of particular interest. At this point, if reflux is used, the vapor phase temperature should exceed the boiling point of acetic acid but remain low enough to retain residual acetic anhydride.

To ensure substantially complete reaction, it may be desirable to utilize an excess amount of acetic anhydride in conducting the acetylation. The amount of excess anhydride utilized will vary depending upon the particular acetylation conditions employed, including the presence or absence of reflux. The use of an excess of from about 1 to about 10 mole percent of acetic anhydride, based on the total moles of reactant hydroxyl groups present is not uncommon.

To obtain both complete acetylation and maintenance of stoichiometric balance, anhydride loss should be minimized. Acetic acid vaporizes at temperatures of about 118° C. At higher temperatures, i.e., about 140° C. acetic anhydride also begins to vaporize. Providing the reactor with a means of providing controlled vapor phase reflux is desirable. Maintaining vapor phase reflux temperature at about 120° to about 130° C. is particularly desirable.

Polycondensation of the acetylated starting materials generally begins to take place at a temperature within a range of from about 210° to about 260° C. As acetic acid is also a byproduct of the polymerization reaction, it is desirable to employ controlled vapor phase reflux when conducting the polycondensation reaction. In the absence of controlled vapor phase reflux, acetic anhydride, acetoxybenzoic acid and other volatile materials are vaporized as the polymerization temperature is increased. Depending on the particular polymer synthesized, it is preferable to maintain vapor phase reflux temperatures of about 120° to about 130° C. during the polymerization reaction.

As one approaches the final polymerization temperature, volative byproducts of the reaction having boiling points above that of acetic acid and acetic anhydride should be removed. Accordingly at reactor temperatures of about 250° C. to about 300° C., vapor phase reflux, if used, is generally adjusted to allow higher vapor phase temperatures or is discontinued. The polymerization is generally allowed to proceed until a desired polymer viscosity is reached. To build molecular weight in the melt, the polymerization reaction is generally conducted under vacuum, the application of which facilitates the removal of volatiles formed during the final stage of the polycondensation.

Following polymerization, the molten polymer is discharged from the reactor, typically through an extrusion orifice fitted with a die of desired configuration, cooled and collected. Commonly, the melt is discharged through a perforated die to form strands which are taken up in a water bath, pelletized and dried.

If desired, the molecular weight of the preformed polymer may be advanced by solid state polymerization or other post-polymerization treatments; however, by applying a vacuum in the final stages of polymerization as outlined above, it may be possible to reach a desired molecular weight without solid stating.

Using a potassium catalyst in combination with a cobalt catalyst has been found to provide a means of reducing the reaction temperature and/or increasing the reaction rate of the polymerization reaction, which in turn tends to minimize polymer degradation. As degradation is often manifested by a darkening of color, polymer produced by this process may be lighter in appearance. Increasing the reaction rate can also improve process efficiency and reduce costs.

Potassium catalysts suitable for use in the practice of this invention include the potassium salts of carboxylic acids, potassium oxides, including the oxides of aliphatic alcohols and aromatic phenols, potassium hydroxide, and mixtures thereof. Potassium salts selected from the group consisting of salts of carboxylic acids, preferably $C_2$ to $C_6$ carboxylic acids, are of particular interest. In a preferred embodiment, the potassium salt is potassium acetate. The potassium catalyst is generally used in an amount of from about 10 to about 150 ppm, calculated as weight of metal ion per theoretical weight of polymer. The use of from about 40 to about 80 ppm of potassium catalyst, calculated as weight of metal ion per theoretical weight of polymer is of particular interest.

Cobalt catalysts suitable for use in the practice of this invention include cobalt salts of carboxylic acids, preferably $C_2$ to $C_6$ carboxylic acids, its oxides, carbonates, or complexes salts such as, for example, cobaltic acetylacetonate, and mixtures thereof. Cobalt (II) salts selected from the group consisting of salt of $C_2$ to $C_6$ carboxylic acids are of particular interest. In a preferred embodiment, the cobalt salt is cobalt (II) acetate. The cobalt catalyst is generally used in an amount of from about 20 to about 150 ppm, calculated as weight of metal ion per theoretical weight of polymer. The use of from about 40 to about 80 ppm of cobalt catalyst, calculated as weight of metal ion per theoretical weight of polymer, is of particular interest.

While the total amount of catalyst combined typically ranges from about 300 to about 240 ppm, using the lowest practical amounts of catalyst is desirable. The use of a total amount of from about 80 to about 150 ppm of catalyst is of particular interest.

Anisotropic melt-phase forming polymers formed by the present invention contain at least five different recurring units which, when combined in the polyester, have been found to form an optically anisotropic melt phase at a temperature below approximately 400° C. Unit I of the subject polymers, termed a 4-oxybenzoyl unit, possesses the structural formula:

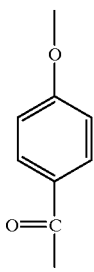

While not specifically illustrated in the structural formula, at least some of the hydrogen atoms present upon the aromatic ring of unit I may be substituted. Included among the representative precursors from which recurring unit I may be derived are: 4-hydroxybenzoic acid; 3-chloro-4-hydroxybenzoic acid; 3-methyl-4-hydroxybenzoic acid; 3-methoxy-4-hydroxybenzoic acid 3-phenyl-4-hydroxybenzoic acid; 3,5-dichloro-4-hydroxybenzoic acid; 3,5-dimethyl-4-hydroxybenzoic acid; 3,5-dimethoxy-4-hydroxybenzoic acid; and the like. In a preferred embodiment, no ring substitution is present on recurring unit I.

Recurring unit II of the subject polymers can be termed a 6-oxy-2-naphthoyl unit; it possesses the structural formula:

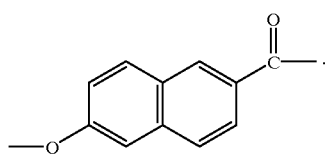

As in the case of recurring unit I, at least some of the hydrogen atoms present upon the aromatic ring structure of recurring unit II may be substituted. Exemplary of such substituents are alkyl groups of 1 to 4 carbon atoms, alkoxy groups of 1 to 4 carbon atoms, phenyl, halogen (e.g., Cl, Br, and I), and mixtures thereof. Representative of the precursors from which recurring unit II may be derived are aromatic hydroxycarboxylic acids which include: 6-hydroxy-2-naphthoic acid; 6-hydroxy-5-chloro-2-naphthoic acid; 6-hydroxy-5-methyl-2-naphthoic acid; 6-hydroxy-5-methoxy-2-naphthoic acid; 6-hydroxy-5-phenyl-2-naphthoic acid; 6-hydroxy-7-chloro-2-naphthoic acid; 6-hydroxy-5,7-dichloro-2-naphthoic acid, and the like. In a preferred embodiment no ring substitution is present on recurring unit II.

Recurring unit III of the subject polymers includes one or moieties of the formula:

wherein Ar¹ is a divalent radical selected from the group consisting of:

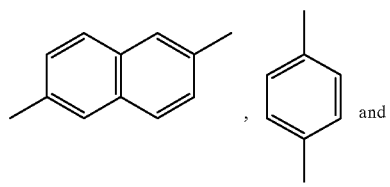

-continued

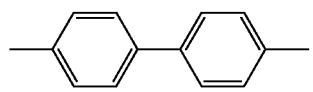

Although not specifically shown in the formulas given, at least some of the hydrogen atoms present upon the aromatic ring structure of recurring unit III may be substituted in a manner similar to that described for recurring unit I. Preferably, no ring substitution is present on recurring unit III. Representative of the precursors from which recurring unit III may be derived are aromatic diols such as, for example, 4,4'-biphenol, hydroquinone, and 2,6-naphthalene diol. In a preferred embodiment recurring unit III comprises moieties derived from 4,4'-biphenol.

Recurring unit IV of the subject polymers includes one or more dicarboxyl moieties of formula:

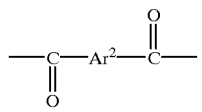

wherein Ar² is selected from the group consisting of:

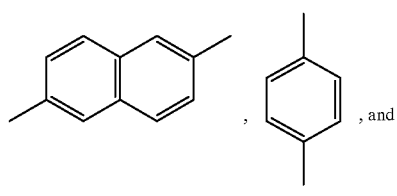

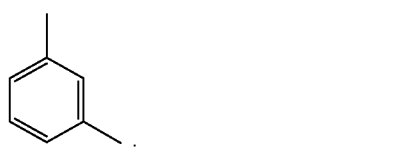

Although not specifically shown in the formulas given, at least some of the hydrogen atoms present upon the ring structure of recurring unit IV may be substituted in a manner similar to that described for recurring unit I. Preferably no ring substitution is present on recurring unit IV. Representative of the precursors from which recurring unit IV may be derived are aromatic diacids such as, for example, terephthalic acid, isophthalic acid, and 2,6-naphthalene dicarboxylic acid. In embodiments of particular interest, recurring unit IV is derived from terephthalic acid or a combination of terephthalic acid and isophthalic acid.

Recurring unit V possesses the structure:

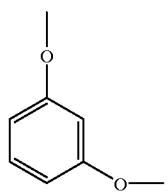

Recurring unit V may be substituted in a manner similar to that described for recurring unit I. Preferably no ring substitution is present on recurring unit V. Resorcinol is representative of the precursors from which recurring unit V may be derived.

The subject process is suitable for the production of polymers having the above-described recurring units. The polymers can be formed into a variety of molded or extruded articles. Selection of particular recurring units and their relative amounts will depend, in large part, on the properties required in the ultimate polymer. Commonly, the polymers will contain from about 20 to about 80 mole percent of recurring unit I, from about 20 to about 80 mole percent of recurring unit II, from about to about 5 to about 25 mole percent of recurring unit III, from about 10 to about 30 mole percent of recurring unit IV and from about 5 to about 25 mole percent of recurring unit V. While the relative amounts of a particular recurring unit are subject to variation, it will be appreciated by those skilled in the art that the molar quantities of recurring units III and V combined will be substantially equal to the molar quantities of recurring unit IV.

The process of this invention is especially suited to the production of polymers consisting essentially of recurring units of the formula:

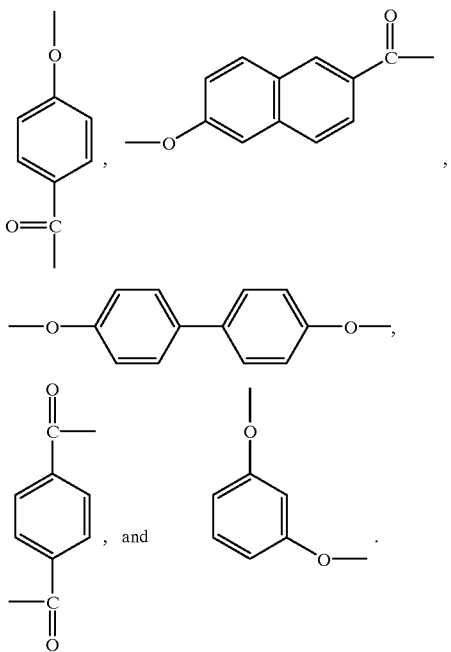

Minor amounts of other ester-forming moieties may be present in the subject polymers, provided that the resulting polymer retains its anisotropic melt-forming characteristics. In general, the various recurring units will be present in the resultant polymers in a random configuration. Preferably the polymers are wholly aromatic.

The polymers formed by the process of this invention commonly exhibit a weight average molecular weight of from about 10,000 to about 80,000. The molecular weight of preference will depend, in part, on the desired end-use application for which the polymers are intended. For example, in injection molding applications, weight average molecular weights of from about 10,000 to about 40,000 are commonly of interest, whereas, for encapsulant applications lower weight average molecular weights, e.g., about 2,000 to about 5,000, are generally preferred. The polymers typically exhibit an inherent viscosity (I.V.), measured at 25° C. as a 0.1% by weight solution of polymer in a mixture of equal volumes of pentafluorophenol and hexafluoroisopropanol, of at least about 1.0 dl/g, with polymers having inherent viscosities of from about 1.0 dl/g to about 8.0 dl/g being of particular interest.

Characteristic of the subject polymers is the formation of an anisotropic melt phase in which are formed liquid crystals. Thus, in the melt there is a high tendency for the polymer chains to orient in the shear direction. Such thermotropic properties are manifest at a temperature which is amenable for melt processing to form shaped articles. Anisotropy in the melt may be confirmed by conventional polarized light techniques.

In a preferred embodiment this invention is directed to a process for producing a polymer consisting essentially of recurring units of the formula:

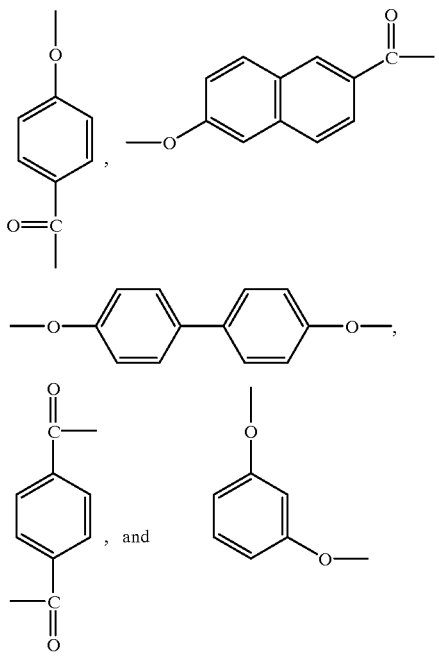

which comprises which comprises the steps of:
(a) heating a polymerization mixture comprising the aromatic diacid and acetate form of the reactants from which said recurring units are derived in the presence of a catalyst comprising from about 40 to about 80 ppm of potassium catalyst, as metal ion per theoretical weight of polymer and from about 40 to about 80 ppm of cobalt catalyst, as metal ion per theoretical weight of polymer, to a temperature sufficient to induce polymerization at a rate which avoids sublimation of the acetates or the oligomeric products initially produced; and
(b) maintaining the mixture at polymerization temperature for a period of time sufficient to produce a polymer of desired melt viscosity.

EXAMPLES

The following examples are presented to further illustrate this invention. The examples are not, however, intended to limit the invention in any way.

Example 1

A 4 liter 3-necked flask equipped with a stainless steel "C"-shaped agitator, gas inlet tube, thermocouple, and Vigereux column attached to a condenser and receiver was charged with 3.0 moles of 4-hydroxybenzoic acid, 3.0 moles of 6-hydroxy-2-naphthoic acid, 2.0 moles of terephthalic acid, 1.0 moles of 4,4'-biphenol, 1.0 moles of resorcinol. A catalyst mixture of 0.21 grams of potassium acetate (60 ppm, as moles of metal ion per theoretical moles of polymer) and 0.36 grams of cobalt acetate tetrahydroate (60 ppm, as moles of metal ion per theoretical moles of polymer) was added to the flask and the flask was immersed into an electrically heated fluidized sand bath. The flask was purged of oxygen by evacuation and flushed with dried nitrogen before acetic anhydride (10.04 moles) was added. While purging with nitrogen, the contents of the flask were stirred at 100 rmp and heated according to the following profile: room temperature to 125° C. over 50 minutes; to 140° C. over 40 minutes; to 150° C. over 20 minutes; to 200° C. over 45 minutes; to 210° C. over 5 minutes; to 220° C. over 6 minutes; to 330° C. over 110 minutes; and to 340° C. over 20 minutes. During this time acetic acid that evolved was removed by distillation. After holding at 340° C. for 30 minutes a vacuum was applied, reducing the pressure to <10 mbar within 10 minutes. The progress of the polymerization was monitored by the increase in torque (measured as millivolts and abbreviated as "mV") required to maintain the 100 rpm agitation rate. When the increase in torque reached 40 mV, the vacuum was broken to stop the reaction. The total time under full vacuum (<10 mbar) required to reach the torque target was 48 minutes. The resulting polymer had an I.V. of 3.0 dl/g, measured at 25° C. as a 0.1% by weight solution of polymer in a mixture of equal volumes of pentafluorophenol and hexafluoroisopropanol, a $T_g$ of 110° C. (as determined by differential scanning calorimetry or "DSC"), and a melt viscosity of 1493 poise at shear rate of 1000 sec$^{-1}$ (measured at 270° C. in a capillary rheometer using an orifice 1 mm in diameter and 20 mm long).

Comparative Example 1A

The procedure followed in Example 1 was run using 0.21 grams of potassium acetate (60 ppm as moles of metal ion per theoretical moles of polymer) as the only catalyst. The torque reacted 40 mV after heating at 340° C. for 93 minutes, at which point the vacuum was broken to stop the reaction. The resulting polymer had an I.V. of 3.0 dl/g, a $T_g$ of 110° C. and a melt viscosity of 1497 poise at a shear rate of 1000 sec$^{-1}$; all as measured under the conditions specified in Example 1.

Example 2

The procedure described in Example 1 was run using 0.21 grams of potassium acetate (60 ppm as moles of metal ion per theoretical moles of polymer) and 0.36 grams of cobalt acetate tetrahydrate (60 ppm as moles of metal ion per theoretical moles of polymer). The heating profile (adjusted so that the final temperature was 290° C.) was as follows: room temperature to 125° C. over 50 minutes; to 140° C. over 40 minutes; to 150° C. over 20 minutes; to 200° C. over 45 minutes; to 210° C. over 5 minutes; to 220° C. over 6 minutes; to 280° C. over 60 minutes; and to 290° C. over 30 minutes. The increase in torque reached 30 mV after 69 minutes under full vacuum. The resulting polymer had an I.V. of 2.9 dl/gm, a Tg of 109° C. and a melt viscosity of 486 poise at a shear rate of 1000 sec$^{-1}$; all as measured under the conditions specified in Example 1. The polymer was much lighter in color than the polymer made in Example 1.

Comparative Example 2A

The procedure described in Example 2, with a final polymerization temperature of 290° C., was run using 0.42 grams of potassium acetate (120 ppm as moles of metal ion per theoretical moles of polymer) as the only catalyst. After 73 minutes under full vacuum, the torque had increased to only 10 mV. The polymer I.V. was 2.6 dl/gm, the Tg was 107° C. and the melt viscosity was 246 poise at a shear rate of 1000 sec$^{-1}$; all as measured under the conditions specified in Example 1.

Comparative Example 2B

The procedure described in Example 2, with a final polymerization temperature of 290° C., was run using 0.72 grams of cobalt acetate tetrahydrate (120 ppm as moles of metal ion per theoretical moles of polymer) as the only catalyst. After 70 minutes under full vacuum, the torque had increased to only 3 mV. Since the resulting polymer appeared to have a very low molecular weight, the measurement of I.V., melt viscosity, and Tg were not attempted.

What is claimed is:

1. A process for preparing an anisotropic melt-phase forming polymer consisting essentially of recurring units I, II, III, IV and V, wherein:

recurring unit I is:

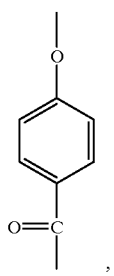

recurring unit II is:

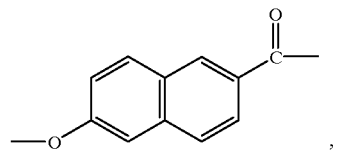

recurring unit III is:

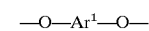

wherein Ar$^1$ is a divalent radical selected from the group consisting of:

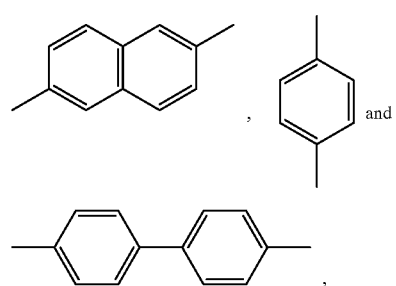

and mixtures thereof, recurring unit IV is:

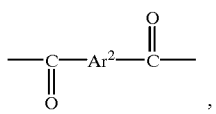

wherein Ar² is selected from the group consisting of:

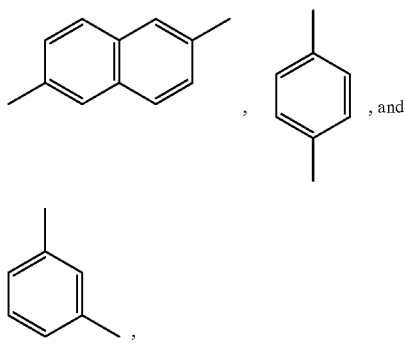

and mixtures thereof, and recurring unit V is:

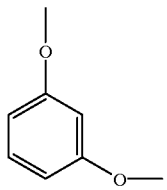

which process comprises reacting the aromatic diacid from which recurring unit IV is derived and acetate form of the reactants from which recurring units I, II, III and V are derived in the presence of a catalytic amount of a catalyst system comprising a potassium catalyst in combination with a cobalt catalyst.

2. A process as described in claim 1 wherein the potassium catalyst is present in an amount of from about 10 to about 150 ppm, calculated as weight of metal ion per theoretical weight of polymer and the cobalt catalyst is present in an amount of from about 10 to about 150 ppm, calculated as weight of metal ion per theoretical weight of polymer.

3. A process as described in claim 1 wherein the potassium catalyst is selected from the group consisting of potassium salts of carboxylic acids, potassium oxides, and potassium hydroxide, and mixtures thereof.

4. A process as described in claim 3 wherein the cobalt catalyst is selected from the group consisting of cobalt salts of carboxylic acids, the oxides, carbonates and complex salts of cobalt, and mixtures thereof.

5. A process as described in claim 4 wherein the potassium catalyst is present in an amount of from about 40 to about 80 ppm, calculated as weight of metal ion per theoretical weight of polymer and the cobalt catalyst is present in an amount of from about 40 to about 80 ppm, calculated as weight of metal ion per theoretical weight of polymer.

6. A process as described in claim 5 wherein the potassium catalyst is the potassium salt of a $C_2$ to $C_6$ carboxylic acid and the cobalt catalyst is the cobalt (II) salt of $C_2$ to $C_6$ carboxylic acid.

7. A process as described in claim 6 wherein the potassium salt is potassium acetate.

8. A process as described in claim 7 wherein the cobalt salt is cobalt acetate.

9. A process for producing a polymer consisting essentially of recurring units of the formula:

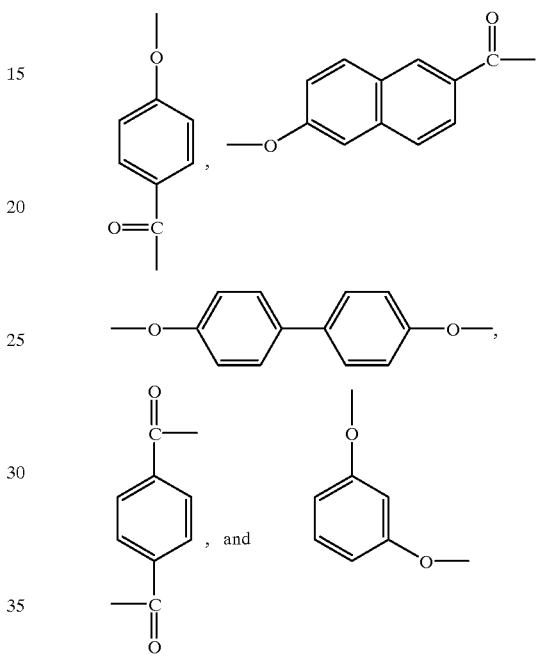

which comprises which comprises the steps of:

(a) heating a polymerization mixture comprising the aromatic diacid and acetate form of the reactants from which said recurring units are derived in the presence of a catalyst comprising from about 40 to about 80 ppm of potassium catalyst, as metal ion per theoretical weight of polymer and from about 40 to about 80 ppm of cobalt catalyst, as metal ion per theoretical weight of polymer, to a temperature sufficient to induce polymerization at a rate which avoids sublimation of the acetates or the oligomeric products initially produced; and (b) maintaining the mixture at polymerization temperature for a period of time sufficient to produce a polymer of desired melt viscosity.

10. A process as described in claim 9 wherein the potassium catalyst is the potassium salt of a $C_2$ to $C_6$ carboxylic acid and the cobalt catalyst is the cobalt (II) salt of $C_2$ to $C_6$ carboxylic acid.

11. A process as described in claim 10 wherein the potassium catalyst is potassium acetate and the cobalt catalyst is cobalt acetate.

* * * * *